Aug. 30, 1938.  E. W. DAVIS  2,128,636
FLUID CONTROL VALVE
Filed Aug. 26, 1933  3 Sheets-Sheet 1
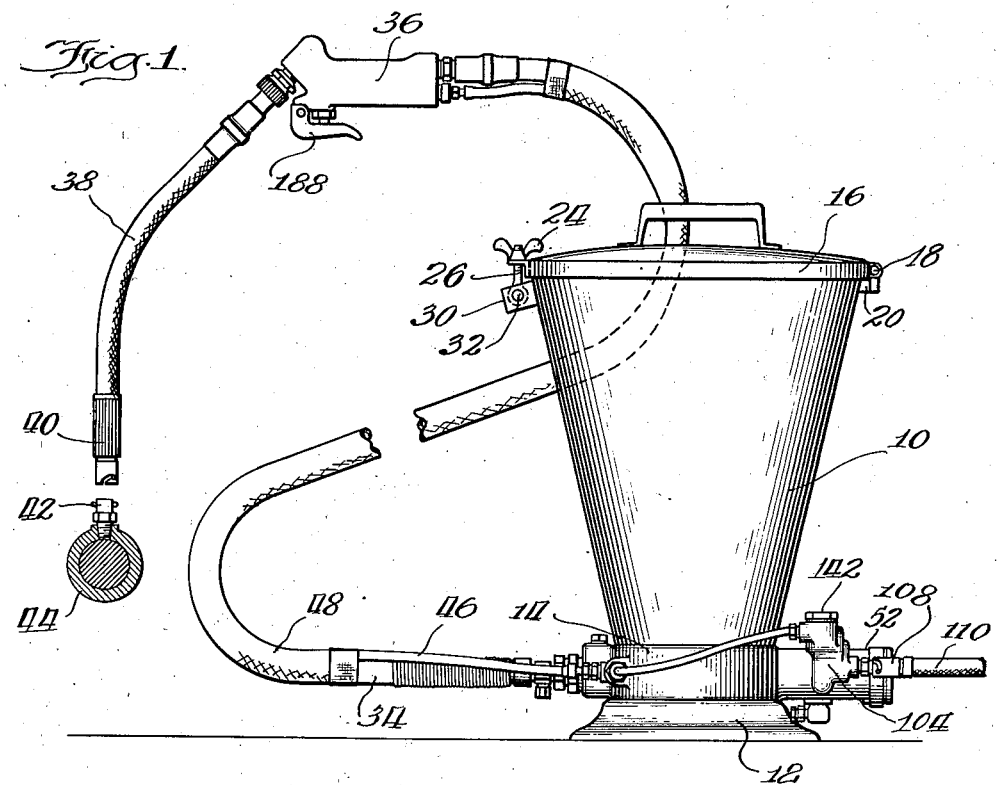
Inventor
Ernest W. Davis
By
Williams, Bradbury, McCall & Hinkle
Attys.

Aug. 30, 1938.　　　E. W. DAVIS　　　2,128,636
FLUID CONTROL VALVE
Filed Aug. 26, 1933　　　3 Sheets-Sheet 2
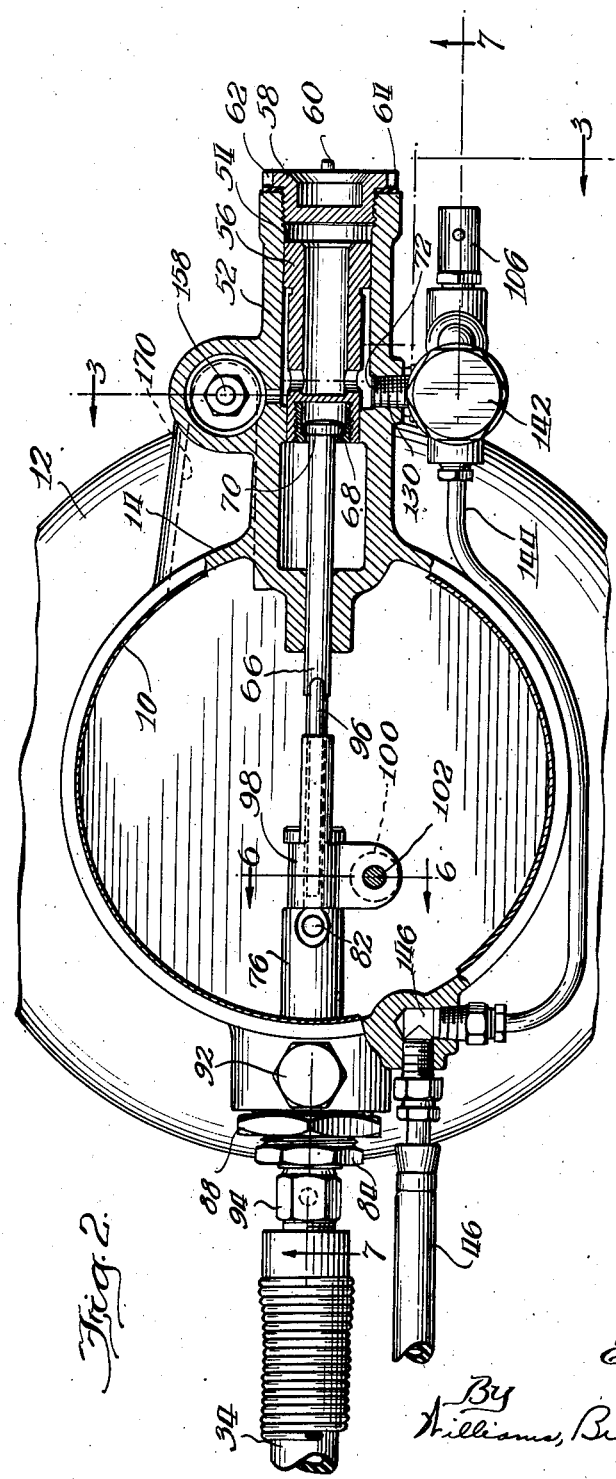
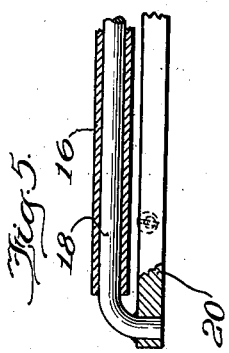
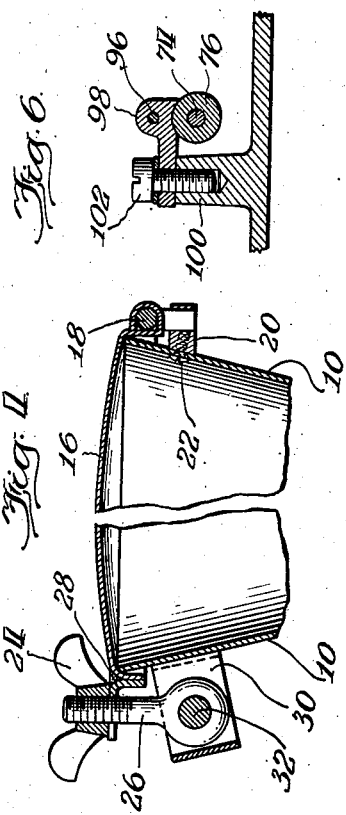
Inventor:
Ernest W. Davis Aug. 30, 1938.  E. W. DAVIS  2,128,636
FLUID CONTROL VALVE
Filed Aug. 26, 1933  3 Sheets-Sheet 3
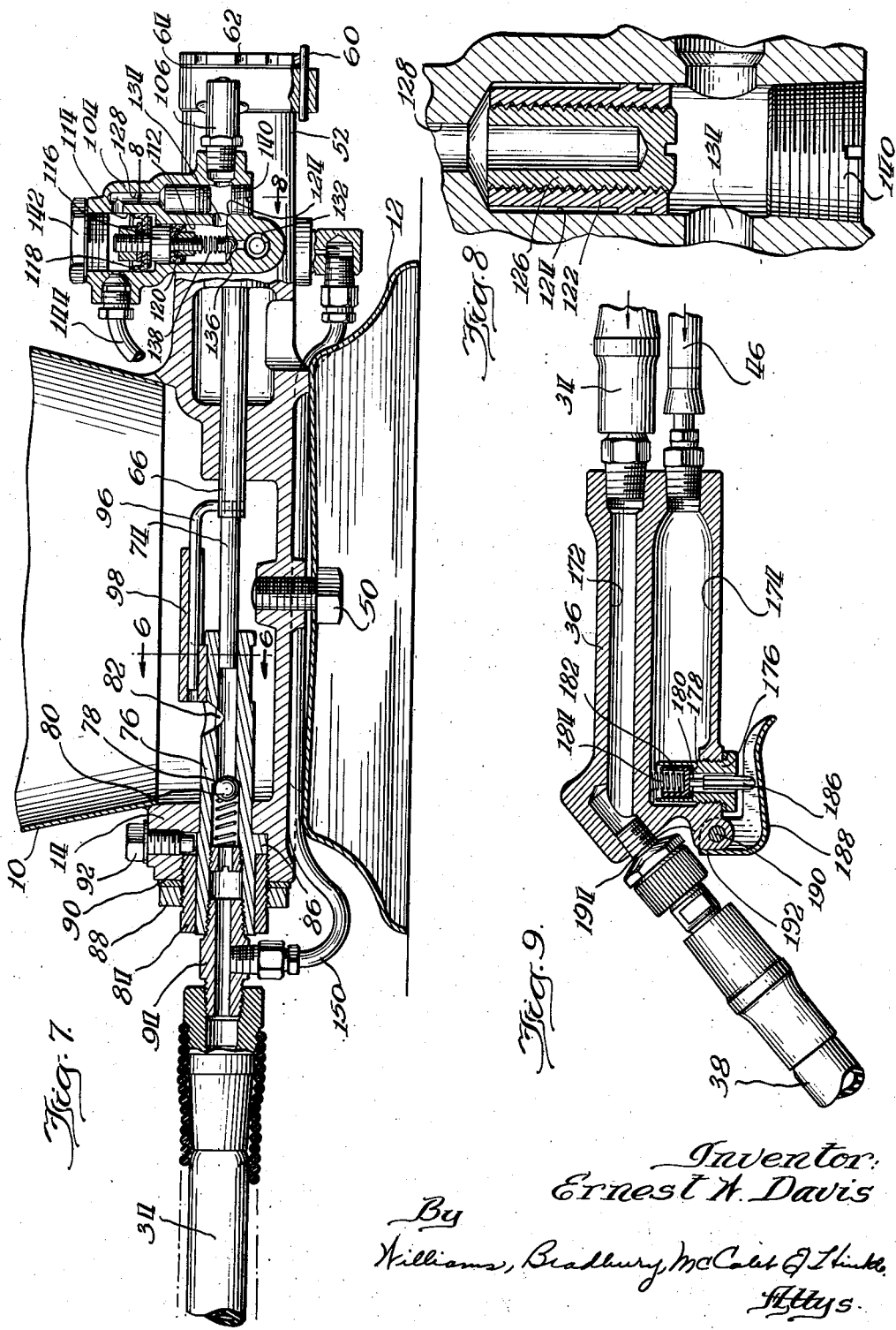
Inventor:
Ernest W. Davis
By
Williams, Bradbury, McCaleb & Hinkle
Attys.

Patented Aug. 30, 1938

2,128,636

UNITED STATES PATENT OFFICE 2,128,636

FLUID CONTROL VALVE

Ernest W. Davis, Oak Park, Ill., assignor, by mesne assignments, to Stewart-Warner Corporation, Chicago, Ill., a corporation of Virginia Application August 26, 1933, Serial No. 686,928

7 Claims. (Cl. 137—139)

My invention relates generally to control means for fluid pressure actuated motors and the like, and more particularly for pneumatically operated high pressure lubricant compressors.

It is an object of my invention to provide a pneumatically operated lubricant compressor with improved means for controlling its operation.

A further object is to provide an improved controlling means for pneumatically operated lubricant compressors in which the manually controlled element may be located relatively remote from the compressor and in which but a single air conducting conduit between the compressor and the manual control element is required.

A further object is to provide an improved lubricant compressor control means which will be efficient in operation and which may be economically manufactured.

Other objects will appear from the following description, reference being had to the accompanying drawings, in which:

Fig. 1 is a side elevation of the lubricant compressor with its valve controlled discharge conduit for supplying lubricant to bearings to be lubricated;

Fig. 2 is a sectional view taken on a broken horizontal plane passing through the center line of the air motor and immediately above the pump cylinder structure;

Fig. 3 is a side elevation of the lubricant compressor, the air operated lubricant pressure relief mechanism being shown in section;

Fig. 4 is a vertical sectional view of the upper end of the lubricant reservoir and cover therefor;

Fig. 5 is a detailed sectional view showing the cover hinge;

Fig. 6 is a vertical sectional view taken on the line 6—6 of Fig. 7;

Fig. 7 is a vertical sectional view taken on the line 7—7 of Fig. 2;

Fig. 8 is a central vertical sectional view of the air bleed device; and

Fig. 9 is a central sectional view of the control valve.

The lubricant compressor shown herein as an appropriate apparatus with which the present invention may be used is of the pneumatically operated type usable for the high pressure lubrication of machinery, particularly automobiles. It comprises generally a hopper type reservoir 10, a base 12, and a body casting 14. The reservoir 10 is closed by a cover 16 (Fig. 4) pivoted upon a hinge pin 18 which is secured to a hinge bracket 20, as shown in Fig. 5, the hinge bracket 20 being secured to the reservoir 10 by screws 22 or any other suitable means. The cover 16 is secured in closed position by turning down the wing nut 24 threaded on a pivoted screw 26, the nut engaging a slotted angle piece 28 welded to the cover 16. A bracket 30 welded to the reservoir 10, and a rivet 32 carried by the bracket, form a pivotal support for the screw 26.

Lubricant discharged from the pump is conveyed through a flexible hose 34 which at its outer end is connected to the body 36 of a control valve. A whip end lubricant discharge hose 38 is connected to the body 36 of the control valve, and at its extremity carries a coupler 40 for making quick detachable connections with any one of a plurality of lubricant receiving fittings 42 connected to bearings 44 to be lubricated. An air control hose 46 is preferably clipped to or held adjacent the hose 34 by means of a sheath 48.

As shown in Fig. 7, the reservoir 10 is welded to the casting 14, and the latter is secured to the base 12 by means of a cap screw 50, the upper surface of the base 12 being dished so that the cap screw may be drawn tightly against the base casting.

Formed integrally with the base casting 14 is an air motor body 52 having a cylindrical bore 54 in which the piston 56 is reciprocable. The end of the cylinder 54 is closed by a head 58 threaded into the cylinder and locked in position by a tapered pin 60 (Fig. 7) which projects through one of a plurality of notches 62 formed in the flange of the head 58. A gasket 64 is interposed between the flange of the cylinder head and the end of the cylinder body. A plunger rod 66 is loosely connected to the piston 56 by an inwardly flanged sleeve 68, a head 70 formed on the end of the plunger rod 66 thus being retained, and limited lost motion between the plunger rod 66 and piston 56 permitted.

The air motor is generally similar to that shown and described in Davis Patents Nos. 1,830,643, and 2,051,290. It will suffice here to state that when air under pressure is supplied to the cylinder 54 through its inlet opening 72, the piston 56 will be continuously reciprocated.

The piston of the air motor is moved substantially solely by its kinetic energy during that portion of its stroke which is effective in moving the plunger through its pressure discharge stroke. The piston will thus force the plunger to eject the lubricant by hammer-like blows, making it possible to build up extremely high pressures.

The plunger rod 66 carries a plunger 74 which is reciprocable in a cylinder body 76. The body 76 is counterbored to form a seat 78 for a spring pressed ball check valve 80, and has an inlet port 82. The cylinder body 76 is held within the body 14 by a bushing 84 threaded in the body and engaging a flange 86 formed on the cylinder 76. A lock nut 88 and washer 90 prevent accidental loosening of the bushing 84, and the cylinder body 76 is held against rotation by a set screw 92 threaded in the body and having its end engaging in a notch cut in the flange 86. A T 94 is threaded in the end of the cylinder body 76 and forms a means for attaching the discharge hose 34 to the cylinder outlet. An agitator rod 96 is secured to the plunger rod 66 and is guided for longitudinal movement in a bracket 98 which is rigidly secured to a boss 100 projecting upwardly from the bottom of the casting 14 (as shown in Fig. 6), by means of a cap screw 102. The agitator rod 96 thus reciprocates with the plunger and plunger rod in a path extending over the inlet opening 92, thereby breaking up any large air bubbles which may be present in the grease. This agitator mechanism is claimed in my Patent No. 2,062,447.

Air under pressure is supplied to the inlet 72 of the air motor through a novel form of control mechanism, best shown in Figs. 7 and 8, and comprising a body 104. An air inlet fitting 106 is threaded in the body 104 and is adapted to be coupled with a coupler 108 secured at the end of an air supply hose 110 (Fig. 1). The body 104 has a relatively small bore 112 and a counterbore 114 therein. Within the bores 112 and 114 is located a differential piston assembly comprising a guide 116, a large cup leather piston 118, and a smaller cup leather piston 120, these cup leather pistons being suitably secured to the guide member 116.

Air from the source of supply connected to the fitting 106 is conducted to the upper end of the counterbore 114 through a highly restricted passageway formed by a sleeve 122 pressed into a drilled hole 124, and a plug 126. The sleeve 122 is internally threaded throughout its length, and the plug 126 has an external thread extending the full length thereof. The thread on the plug 126 is mutilated by having the apex portion thereof removed so that a helical passageway, substantially triangular in cross section, is formed between the cooperating threads of the plug and the sleeve. Thus air is permitted slowly to bleed from the source between the plug and sleeve and through passageway 128 to the upper end of the cylindrical bore 114.

The body 104 has a sidewardly extending threaded nipple portion 130 threaded in the inlet opening 72 of the cylinder body 52 of the air motor, there being a passageway 132 extending through the portion 130 into the body 104. The air supplied through the inlet fitting 106 may flow into the cylindrical bore 112 through a port 134 but is prevented from flowing from this bore into the passageway 132 by a hemispherical valve 136. The latter is connected to the differential piston member 116 by a tension spring 138, the ends of which may be soldered or otherwise suitably secured to the differential piston member 116 and the valve 136 respectively.

The lower end of the bore 124 is closed by a plug 140 and the upper end of the cylindrical bore 114 is closed by a plug 142. A conduit 144 has one end suitably connected to the upper end of the cylindrical bore 114, the other end being connected to an elbow passageway 146 formed in the body casting 14. The hose 46 is likewise connected to the passageway 146.

Means are provided to relieve the lubricant pressure in the discharge conduit 34 whenever the compressor is not in operation, thereby to relieve the hose of unnecessary strain, to facilitate disconnecting the coupler 40 from the fitting to which it may have been attached, and to eliminate the necessity of providing a valve in the grease discharge conduit.

This means for relieving the lubricant pressure in the discharge hose comprises a valve fitting 148 (Fig. 3) threaded in the body casting 14. The fitting 148 is connected to the T 94 by a suitable conduit 150. A valve 152 is cooperable with a diminutive valve seat 154 formed in the fitting 148, and is biased to move from the seat by a compression coil spring 156. The valve 152 may be formed integrally with a stem 158 guided in a bore 160 and at its upper end carries a cup leather piston 162 which is reciprocable in a cylinder 164. The upper end of the cylinder is closed by a screw plug 166, the interior of this cylinder being in communication with the cylindrical bore 54 of the air motor through a passageway 168. The lubricant which passes the valve 152 flows through a cavity 170 formed in the body casting 14 and which is in communication with the interior of the reservoir tank 10.

The manually operated control valve has a pair of cored passageways 172 and 174 formed in the body 36, the passageway 172 forming a direct path of communication between the hose 34 and the whip end hose 38.

An air relief valve fitting 176 is threaded into the body 36, projecting into the passageway 174. The fitting 176 is drilled and bored to form a shoulder 178 upon which a gasket 180 is seated. A valve 182 is normally pressed against the seat by a compression coil spring 184. A valve operating plunger 186, polygonal in cross section, is guided within the fitting 176 and is adapted to be moved inwardly to raise the valve 182 from its seat by a trigger 188 which is pivotally secured to the body 36 by a shouldered screw 190. Clockwise (Fig. 9) pivotal movement of the trigger 188 is limited by engagement of the web portion 192 of the trigger with the boss 194 on the valve body.

In the use of the lubricant compressor control means of my invention, the air supply hose 110 is coupled to the compressor, whereupon the air under pressure will flow through the fitting 134 into the bores 124 and 112. Due to the fact that the area of the piston 120 is much greater than that of the valve 136, the differential piston assembly 116 will be moved upwardly, tensioning the spring 138 until the pull exerted upon the valve 136 is sufficient to unseat it. Thereupon air under pressure will flow through the passageway 132 to the inlet port 72 of the air motor, causing the latter to begin to operate. In a short time, however, air flowing through the highly restricted passageway formed between the sleeve 122 and plug 126 will raise the pressure in the cylindrical bore 114, conduit 144, hose 46 and passageway 174 sufficiently to cause the differential piston assembly 116 to move downwardly. As this assembly moves downwardly the valve 136 will be seated, cutting off the supply of air to the air motor.

To cause lubricant to be forced to the bearing, the trigger 188 is operated to open the valve 182. Thereupon the air pressure within the passageway 174 and connected hose, conduit and cylindrical bore 114 will drop substantially to atmospheric pressure, whereupon the air pressure exerted upon the piston 120 will raise the differential piston assembly 116, opening the valve 136. After sufficient lubricant has been supplied to a bearing, the trigger 188 is released, whereupon the valve 182 will be returned to its seat by a spring 184 and after a short interval the pressure within the cylindrical bore 114 will be built up by the restricted flow of air through the passageway between the plug 126 and sleeve 122, again causing the differential piston assembly to move downwardly and close the valve 136.

The air flow through the restricted passageway may be of such size as to cause the pressure to be built up within the cylindrical bore 114 in a few seconds after the control valve 182 is closed. By partially unscrewing the plug 126 from the sleeve 122 the quantity of air flowing through the helical passageway may be increased if it is desired to have the air motor respond more rapidly to operation of the control valve. However, the resistance to flow of air through the helical passageway should be sufficiently great that an excessive volume of air is not lost through this passageway during the operation of the lubricant compressor.

The connection between the valve 136 and the differential piston assembly 116 formed by the spring 138 causes the valve 136 to open with a rapid snap action. This is due to the fact that as the differential piston assembly 116 moves upwardly the spring 138 is stretched until sufficient force is exerted to unseat the valve 136. As soon as this valve moves the slightest distance away from its seat, the air pressure upon this upper surface is slightly decreased by the flow of air and the pressure on its lower surface slightly increased, thereby making it possible for the spring 138 to contract and rapidly raise the valve 136 from its seat. Whenever the valve 136 is closed, the air pressure within the air motor cylinder 54 and hence in the piston cylinder 164 will drop rapidly substantially to atmospheric pressure, and the spring 156 will raise the valve 152 from its seat, thereby relieving the pressure in the lubricant discharge hose 34.

As previously pointed out, this relief of pressure in the lubricant discharge hose makes it unnecessary to provide a lubricant flow controlling valve in the discharge hose, and with the type of couplers 40 ordinarily used, makes it easy to disconnect this coupler from the lubricant receiving fitting. This means for relieving the pressure in the lubricant discharge conduit also has the advantage over the lubricant shut-off valve commonly provided in the lubricant discharge hose, because when the latter is used the lubricant pressure in the whip end portion 38 of the lubricant discharge hose is not relieved and after the coupler 40 has been disconnected from the lubricant receiving fitting the contraction of the hose and the expansion of air mixed with the grease will frequently cause a quantity of lubricant to exude from the coupler.

While I have shown and described a particular embodiment of my invention, it will be readily understood by those skilled in the art that variations may be made in the construction disclosed without departing from the basic features of my invention. I therefore do not wish to be limited to the precise construction disclosed but wish to include within the scope of my invention all such modifications and variations which will readily suggest themselves.

What I claim as new and desire to secure by United States Letters Patent, is:

1. A control mechanism for a compressed air operated motor comprising, a valve to control the flow of air from a source of air under pressure to the motor, air pressure operated means to hold said valve closed, a yielding operating connection between said valve and said piston, means including a highly restrictive passageway for supplying air under pressure to said means, and a valve manually operable to vent said means to the atmosphere thereby relieving the air pressure on said air pressure operated means and permitting said first named valve to open.

2. In a mechanism for controlling a pneumatically operated motor, the combination of a passageway for conducting air from a source of air under pressure to an air operated motor, a valve in said passageway normally held closed by air pressure, a pair of cylinders of different diameter adjacent said valve, a pair of connected pistons one in each of said cylinders, a spring connecting said pistons with said valve, means for supplying air under pressure from said source directly to the smaller of said cylinders, a highly restricted passageway for conducting air under pressure from said source to said cylinder of larger diameter, and manually operated valve means located at a distance from said cylinders for relieving the pressure in the larger of said cylinders.

3. In a mechanism for controlling the flow of air under pressure to a passageway, the combination of a valve operable to control the flow of air through said passageway, a piston for operating said valve, a resilient operative connection between said piston and said valve, a cylinder for said piston, a restricted passageway for conducting air under pressure to said cylinder, and means located remotely from said cylinder for venting said cylinder to the atmosphere.

4. A control mechanism for a fluid pressure motor comprising a valve to control the flow of fluid from a source of fluid under pressure to the motor, snap action means for controlling said valve, means exposed to said fluid under pressure for actuating said snap action means, control means for accumulating fluid under pressure, manual means for relieving the pressure of the fluid accumulated in said control means, fluid flow regulating means for supplying fluid under pressure to said accumulating means, and means operated by the fluid pressure in said accumulating means for closing said valve.

5. In a pressure operated valve structure, a pressure chamber, a pilot valve arranged to release pressure in said chamber, a fluid conduit, means forming a relatively narrow passage which affords communication between said fluid conduit and the chamber, said chamber including a cylinder and a plunger sealingly engaging the cylinder and adapted to be actuated in one direction by the fluid admitted to the chamber through said passage, a valve controlling the fluid in the conduit, and a spring operatively connecting the plunger and said latter valve, whereby upon release of pressure in the pressure chamber the recoil of the spring will break the adhesion between the plunger and the cylinder.

6. In a valve apparatus, means adapted to contain fluid under pressure, said means having a fluid discharge valve including a discharge port and a plug for closing the port, the plug and port being so arranged that pressure in the first-named means may move the plug to open the port, means forming a pressure chamber and means adapted and arranged to quickly release pressure therein, the pressure-chamber-forming means including a cylinder and a plunger slidable therein and operatively connected to the valve plug to close the valve when the plunger moves in one direction in its cylinder, means to supply fluid under pressure to the chamber, at a relatively slow rate, said latter means acting in cooperation with the plunger with greater effective force tending to close the valve than is exerted by said fluid under pressure in the first-named means tending to open the valve, so that the valve is normally maintained closed, the operating connection between the plunger and valve comprising resilient energy-storing means, whereby, upon quick release of the pressure in the chamber the released energy will cause the plunger to move in the opposite direction in its cylinder irrespective of static friction between the coacting plunger and cylinder surfaces tending to cause the plunger to resist movement.

7. In a valve apparatus, comprising a valve adapted and arranged to close a fluid exit for fluid under pressure, said valve including a part movable to fluid releasing position, a pressure chamber and means slidable therein and yieldingly operatively connected with said valve part in a manner to cause it to close such exit, and to subsequently move relative to said valve part without affecting the operation of said part, and means including a passage communicating with said chamber to admit operating fluid under pressure to the chamber to actuate the slidable means, a pilot valve operatively associated with the pressure chamber and adapted for operation to release pressure in the chamber, said pilot valve having greater fluid discharge capacity than said passage.

ERNEST W. DAVIS.